United States Patent
Stratton

[15] 3,659,650
[45] May 2, 1972

[54] OIL RECOVERY PROCESS
[72] Inventor: Charles A. Stratton, Bartlesville, Okla.
[73] Assignee: Phillips Petroleum Company
[22] Filed: June 15, 1970
[21] Appl. No.: 46,552

[52] U.S. Cl. ..........................................166/275, 252/8.55 D
[51] Int. Cl. ............................................................E21b 43/22
[58] Field of Search ..........................................166/273–275; 252/8.55 D, 342

[56] References Cited

UNITED STATES PATENTS

| | | | |
|---|---|---|---|
| 3,500,923 | 3/1970 | Reisberg | 166/274 |
| 2,454,544 | 11/1948 | Bock et al. | 252/342 X |
| 2,454,545 | 11/1948 | Bock et al. | 252/342 UX |
| 3,308,883 | 3/1967 | Foster | 166/275 |
| 3,508,612 | 4/1970 | Reisberg et al. | 166/274 |

Primary Examiner—Stephen J. Novosad
Attorney—Young and Quigg

[57] ABSTRACT

An oil recovery process which employs, as an additive to the aqueous material used for waterflooding, at least one of the reaction product of sulfamic acid and a polyethoxy alcohol or, the ammonium sulfate slat of a polyethoxylated alkylphenol is disclosed.

8 Claims, No Drawings

OIL RECOVERY PROCESS

This invention relates to a process for secondary recovery of crude oil by waterflooding.

In an application Ser. No. 858,855 filed by me on Sept. 17, 1969, now U.S. Pat. No. 3,583,486 and incorporated herein by reference, there was disclosed and claimed a method for producing oil from an oil-bearing stratum. That method employed a polyethoxy alcohol having eight to 12 ethoxy units as an additive to, or a component of, an aqueous fluid drive.

It has now been determined that compounds which are the reaction products of sulfamic acid and such polyethoxy alcohols are useful waterflood additives. Relatedly, it has been determined that the ammonium sulfate salts of polyethoxylated alkylphenols are similarly useful waterflood additives, either as such, or when polymerized to form the ammonium sulfate salt of the ethoxylated poly-molecule. This invention provides a process for the use of such waterflooding agents.

According to this invention there is provided a process for producing oil from an oil-bearing stratum which comprises injecting into the stratum an aqueous slug containing an effective amount of a surface active-viscosifier additive agent selected from the group of compounds having the formulas:

(a) 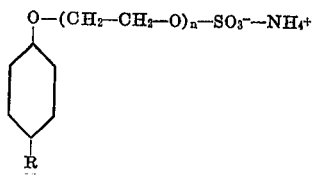

in which R is a halogen, alkyl, cycloalkyl, or an oxyalkyl group having eight to 12 carbon atoms and $n$ has an average value of from 3 to 8, and (b) 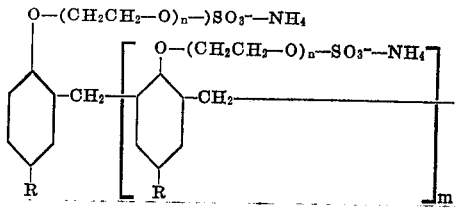

in which R is defined above, $m$ has a value from 1 to 5, and $n$ has an average value of from about 8 to about 11.25, driving the injected slug through the stratum so as to displace the oil from the stratum, and recovering the displaced oil.

The compounds of the invention and complying with the above formulas will be referred to hereinafter as "compound (a)" and "compound (b)."

Accordingly, it is an object of this invention to provide a more efficient method of oil recovery.

Either of these compounds can be prepared in a number of ways. The precursor of compound (a) is a polyethoxylated phenol. This material is converted to its ammonium sulfate salt by reaction with sulfamic acid. Some of its preferred embodiments are derived in this manner from ethoxylated phenols, the ethoxylated phenols being available commercially as Igepal CO 210, Igepal CO 430, Igepal CO 520 and Igepal 530 from Antara Chemical Corp., New York, N.Y. Preferably, the conversion is conducted at temperatures of between about 110 and about 150 in the presence of urea or an amide, such as acetamide as the catalyst, the catalyst being present in an amount of 3–10 g/100 g ethoxylated alkylphenol. Generally, the reaction temperature will be about 135° C. at a reaction time of about 4 hours. The sulfamic acid is employed in stoichiometric amounts or in a slight excess of about 10 percent. The Igepal is selected in accordance to the number of ethoxy groups, that is, $n$, desired in the product.

The precursor of compound (b) is the ethoxylated poly-molecule whose preparation is described in the aforementioned application. This ethoxylated poly-molecule is then reacted with sulfamic acid to convert its chain terminal OH group to $O\text{-}SO_3NH_4$, the ammonium sulfate salt form, in a manner similar to the preparation of compound (a).

Various forms of compounds (a) were prepared by the method described in the following examples.

In a stirred flask, 100 g of polyethoxylated nonylphenol (Igepal CO 210, $n = 3$) and 4 g of acetamide were heated to 130° C. Twenty-seven grams of sulfamic acid were gradually added, the temperature being maintained between 135°–140° C. for about 2 hours. The product was recovered as a sticky solid.

This preparation procedure was repeated employing like quantities of each of the following Igepal compounds to produce ammonium sulfate salts of the polyethoxylated alkylphenols in which $n$ has the value shown:

Igepal CO 430 – $n = 1$
Igepal CO 520 – $n = 4$
Igepal CO 530 – $n = 5$

Various compounds (b) were prepared by the method described in the following example, the preparation being illustrated employing an alkylphenol, as the starting compound.

Two hundred and three-tenths grams or 1 mole of nonylphenol and 1.23 g of sodium were allowed to react in a stirred reactor at 125° C. Incrementally, 22.54 g formaldehyde in the form of paraformaldehyde were added during which addition the temperature was increased to 135° C. After 45 minutes, the temperature was increased to 205° C. and water vapor was vented from the reactor. Gaseous ethylene oxide was introduced into the reactor at a rate of about 1 g per minute until 375 g (8.5 moles/mole of nonylphenol) had been added to the reaction mixture. During this addition, the temperature was permitted to increase from about 60° C. to about 205° C.

One hundred grams of the above product were sulfated employing those quantities of reactants and that procedure employed in the preparation of compound (a).

Preparations were made with a compound having four methylene linked molecules, i.e., $m$ is 4, in which the number of ethoxy groups, i.e., $n$, on each of the methylene linked molecules had average values of 8, 8.5, 9, 9.5, 10 and 11. Mixtures of these compounds were then prepared in which $m$ was equal to 4 and $n$ had values of 9.62, 9.75, 10.5 and 10.75.

In the practice of this invention, the necessary quantity of the surface active-viscosifier additive agent, such as compounds (a) and (b), is dispersed in an aqueous medium, such as water and brine. The amount of the agent employed will be in the range of from about 0.01 to about 5 weight percent of the aqueous medium. Quantities of the aqueous medium employed are those conventional within the art as are the methods of employment of the aqueous medium, and amount to from about 0.01 to about 2 pore volumes. The usual extraneous materials can be included in the aqueous solution, these including $CaCl_2$, $MgCl_2$, etc.

Use of the compounds of the formula (a) of this invention were evaluated by the microslide technique described in U.S. Pat. No. 3,362,474, issued Jan. 9, 1968 to Heino Purre using Nacatoch sand. By this technique, the above-prepared compound (a) produced the following results when employing aqueous solution containing 1.0 weight percent of the compound, in relation to the value of $n$ in their formula:

| $n$ Value | Effectiveness |
|---|---|
| 1 | None |
| 3 | Very |
| 4 | Very |
| 5 | Slight |

The compounds (a) were then tested employing 6 foot tubes containing Nacatoch sand and flooded-out Smackover crude in accordance with well known testing procedures. The sand contained about 136 ml of crude. Compounds (a) were employed individually at concentrations of 0.5 weight percent in simulated formation brine, that is, a brine containing 40.3 g NaCl, 10.6 g $CaCl_2$, and 4.8 g $MgCl_2 \cdot 6H_2O$ per L. After injection of 600 ml of the solution, that is an amount of 2.5 pore volumes, results were as shown below. For comparative purposes, data relative to a nonsulfated polyethoxylated nonylphenol having an average value of 9.5 is included.

| Compound | n | Oil Production, ml. |
|---|---|---|
| Nonsulfated | 9.5 | 14 |
| (a) | 3 | 27 |
| (a) | 4 | 36 |
| (a) | 5 | 31 |

The above data indicate the effectiveness of the compounds (a) of this invention particularly in those embodiments in which $n$ has a value of 3 through 5.

Use of the compounds of the formula (b) of this invention was evaluated by the two aforementioned techniques under substantially identical conditions.

Results employing the microslide technique, as related to the $n$ values of the compounds were as follows:

| $n$ Value | Effectiveness |
|---|---|
| 8 | None |
| 9 | Good |
| 9.75 | Good |
| 10 | Good |
| 10.5 | Very good |
| 10.75 | Excellent |
| 11.0 | Poor |

The results of the 6 foot sand tube tests were as follows:

| $n$ Value | oil Production, ml. |
|---|---|
| 9.75 | 5 |
| 10.0 | 10 |
| 10.5 | 11 |
| 10.75 | 12 |
| 11.0 | 12 |

The above data indicate that compounds of formula (b) in which n has a value between about 8.5 and 10.9, and preferably between about 9.0 and 10.75, provide excellent results when used as waterflood additives.

In respect to some seeming discrepancy between the results of the above tests, it is recognized that such discrepancies are common. However, considering the nature of the tests in comparison to actual conditions under which such compounds are employed, both tests permit considerable predictability of results in actual usage, the 6 foot tube test being, usually, the more predictive.

It will be evident from the foregoing that various modifications can be made to the method of this invention. Such, however, are considered as being within the skill of the art.

I claim:

1. A process for producing oil from an oil-bearing stratum which comprises injecting into the stratum an aqueous slug containing an effective amount of a surface active-viscosifier additive agent having the formula:

(a) 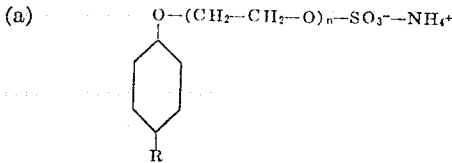

in which R is a halogen, alkyl, cycloalkyl, or an oxyalkyl group having eight to 12 carbon atoms and in which n has an average value of from 3 to 8, driving said slug through said stratum to displace the oil from said stratum, and recovering the displaced oil.

2. The process as defined in claim 1 in which said agent is employed in an amount from about 0.01 to about 5 weight percent of said aqueous slug.

3. The process as defined in claim 1 in which aqueous slug is employed in an amount from about 0.01 to about 2 pore volumes.

4. The process as defined in claim 1 in which said aqueous slug comprises brine.

5. A process for producing oil from an oil-bearing stratum which comprises injecting into the stratum an aqueous slug containing an effective amount of a surface active-viscosifier additive agent having the formula:

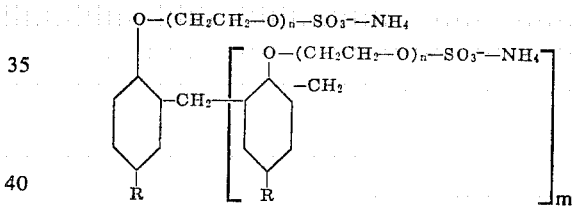

in which R is a halogen, alkyl, cycloalkyl or oxyalkyl group having eight to 12 carbon atoms, m has a value from 1 to 5, and n has an average value of from about 8 to about 11.25, driving said slug through said stratum to displace the oil from said stratum, and recovering the displaced oil.

6. The process as defined in claim 5 in which said agent is employed in an amount from about 0.01 to about 5 weight percent of said aqueous slug.

7. The process as defined in claim 5 in which aqueous slug is employed in an amount from about 0.01 to about 2 pore volumes.

8. The process as defined in claim 5 in which said aqueous slug comprises brine.

* * * * *